Jan. 18, 1938.　　　F. W. GREER　　　2,106,134
CONVEYING APPARATUS
Filed July 2, 1935　　　2 Sheets-Sheet 2

INVENTOR:
Frederick W. Greer,
By his Attorney.

Patented Jan. 18, 1938

2,106,134

UNITED STATES PATENT OFFICE 2,106,134

CONVEYING APPARATUS

Frederick Wade Greer, Belmont, Mass., assignor to J. W. Greer Company, Middlesex, Mass., a corporation of Massachusetts Application July 2, 1935, Serial No. 29,482

10 Claims. (Cl. 198—184)

In using conveyors of the belt type, it frequently becomes desirable to change the direction of movement of the conveyed articles. If they can be transferred from one belt to another then the desired result is easily accomplished, but if the nature of the articles is such that this cannot be done, then the problem presents substantial difficulties. Such a requirement arises, for example, in transferring certain bakery products from the ovens to the packers, or in conveying articles of confectionery, the conditions being such that the pieces must be prevented from touching each other. In addition, they must not be handled roughly. Consequently, it is often important that the transfer of the articles from one belt to another be made without producing any substantial change in the plane of support of the articles, and while maintaining them properly spaced apart.

To device a conveying apparatus that will satisfy these requirements forms the chief object of the present invention.

The nature of the invention will be readily understood from the following description when read in connection with the accompanying drawings, and the novel features will be particularly pointed out in the appended claims.

Figure 1:
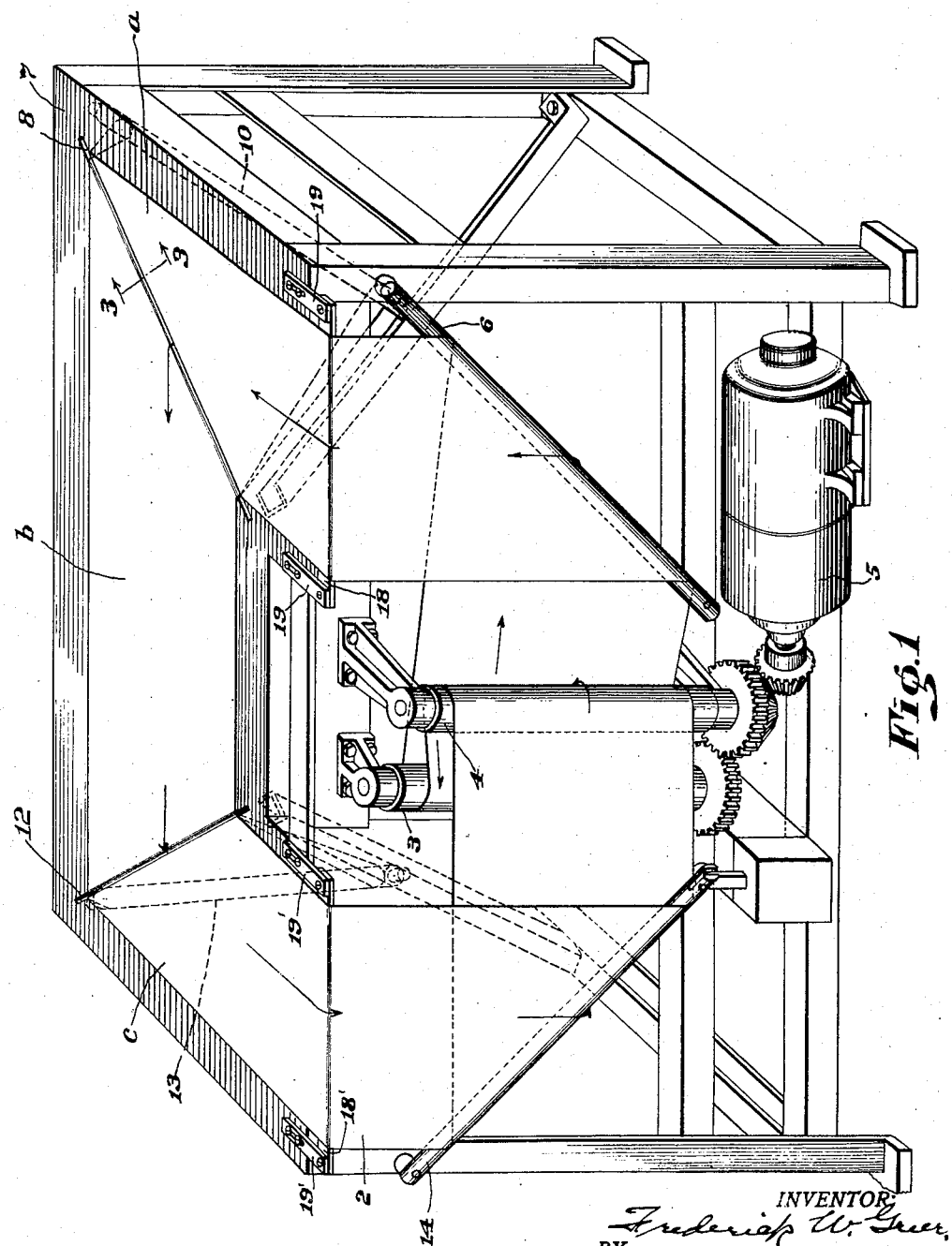
Fig. 1 is a perspective view of an apparatus embodying the invention.

Referring first to Fig. 1, the arrangement there shown comprises an endless conveyor belt 2 associated with suitable guiding means to provide three work supporting portions or runs indicated, respectively, at $a$, $b$, and $c$. The driving mechanism for the belt consists of two vertical rolls 3 and 4 located closely adjacent to each other and geared together, one of the rolls also being geared to a driving motor 5. After traveling around both driving rolls, the belt makes a short run in an approximately horizontal direction to and around an inclined stationary guide rod 6 and then moves upwardly in the direction indicated by the arrow to the receiving end of the first run $a$. This portion of the belt travels across the top of the table 7 to a diagonal slot 8 formed therein. It next moves downwardly through this slot, around a guide roll 10, Figs. 1, 2 and 3, next upwardly through the slot 8 again on to the upper surface of the table, and there travels at right angles to the direction of travel of the run $a$ to another diagonal slot 12 in the table top 7. This portion of the belt between the slots 8 and 12 constitutes the second or middle run $b$. At the latter slot the belt travels downwardly and then up through the slot again, making an idle loop around the roll 13, and next moves forward at right angles to the run $b$, over the front edge of the table, downwardly and around the stationary inclined rod 14, and thence horizontally toward the right, Fig. 1, to the driving roll 4. This completes the circuit through which the belt travels continuously.

Since the angles between adjacent runs in the particular arrangement illustrated in Fig. 1 are of substantially 90°, the stationary guide rods 6 and 14 and the guide rolls 10 and 13 are located at an inclination of approximately 45° from the horizontal plane; and the planes of the two rolls also make an angle of approximately 45° with the direction of travel of the adjacent runs of the belt.

Figure 2:
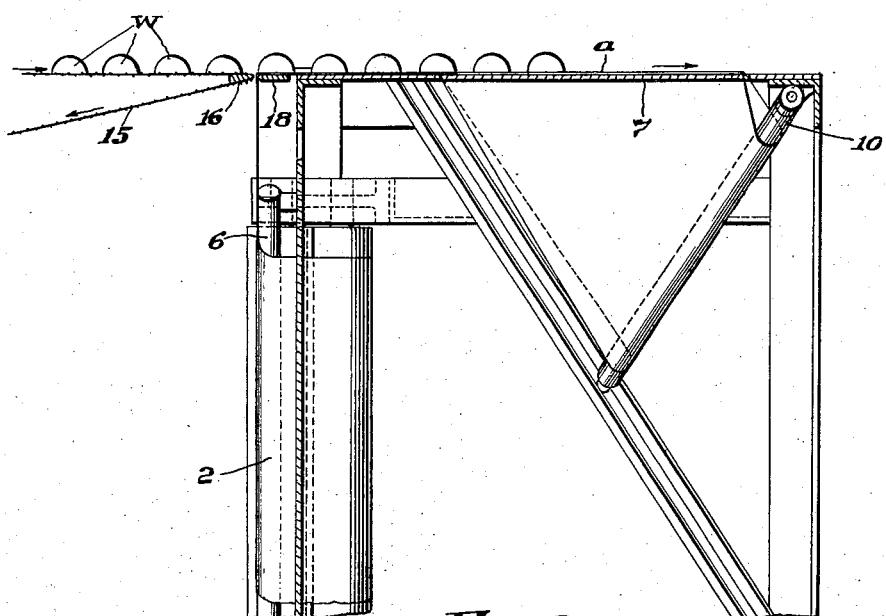
Fig. 2 is a view of the right-hand end of the apparatus shown in Fig. 1, with some parts of the table in section, and illustrates the relationship between this mechanism and another conveyor for delivering articles to this apparatus.
Figure 3:
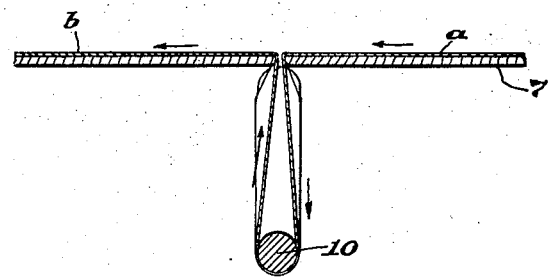
Fig. 3 is a sectional view approximately on the line 3—3, Fig. 1.

A typical use of the invention is illustrated in Fig. 2 which shows a conveyor belt 15 carrying chocolate centers or other articles of work $w$ to the apparatus shown in Fig. 1. At the delivery end of the supply conveyor the belt makes a sharp turn around the knife edge 16 located closely adjacent to and parallel with the receiving end of the first work supporting run $a$ of the conveyor belt 2 and traveling in the same direction as the latter. It delivers its articles of work to the run $a$ which carries them forward to the crevice between the runs $a$ and $b$. Because this crevice is very narrow,—much smaller than either the length or width of the bottom of one of the articles $w$,—these articles are carried across the crevice by the run $a$, picked up by the receiving end of the run $b$, and carried by the latter to the crevice at the slot 12, where these operations are repeated. Due to the fact that the receiving end of each of the runs $b$ and $c$ are located in substantially the same planes as the discharge ends, respectively, of the preceding runs, the transfer of the articles of work from one run to another takes place without any change in the plane of support of these articles. It should also be observed that because these runs are all part of one belt, the articles are conveyed at the same speed regardless of the run, or the portion of the run, on which they are carried. Consequently, if they are properly spaced on the initial conveyor, such spacing will be preserved throughout their travel, and any bunching or crowding of the articles at any point will be avoided. This is particularly important in handling articles that would stick to each other, or which would be injured in any way by contact with each other. At the discharge end of the third run c the articles are usually delivered to another conveyor, like that indicated at 15 in Fig. 2, but running in the opposite direction.

It frequently happens that the conveyor arrangement requires the articles to be turned only through one angle of 90°, or through an angle of lesser extent, and it will be obvious that such an arrangement requires only a minor modification of the general arrangement illustrated. In other words, the angle through which the articles are turned may be made anything suited to the requirements of individual installations.

The conveyor belt used may be made of leather, canvas, duck, or other suitable material. Also, the guide rods 6 and 14 should be smoothed and polished so as to offer as little frictional resistance to the travel of the belt as possible. For the same reason the edges of the table 7 over which the belt travels should be rounded slightly and made very smooth. At the point where the belt travels on to the front edge of the table 7 it is often advantageous, instead of making the belt move around the edge of the table itself, to locate a false edge or bar 18, Figs. 1 and 2, in front of the edge proper of the table and to support this bar on arms 19—19 secured to the top of the table by bolt and slot connections so that the bar can be adjusted toward and from the edge of the table to give the desired degree of tension or tautness to the belt. Fig. 1 also shows the same construction at the point where the belt leaves the table, the corresponding parts being indicated at 18' and 19', respectively. The angles of the guide bars 6 and 14 should, of course, be such as to make the belt travel properly, and in the construction shown this angle is approximately 45°. Also, the guide rolls 10 and 13 which hold taut the idle loops of the belt below the slots 8 and 12, respectively, are correspondingly located, these rolls lying in substantially the same vertical plane as the respective slots, and being located at an angle of approximately 45° to a horizontal plane. This, obviously, assumes that the table top is horizontal and that, consequently, the runs a, b and c all lie in the same horizontal plane.

The invention thus provides an arrangement in which the articles being conveyed can be made to turn any angle desired to suit the requirements of different layouts, while still maintaining the articles in the same conveying plane. While a typical embodiment of the invention has been herein shown and described, it will be evident that the invention is susceptible of embodiment in a considerable variety of forms without departing from the spirit or scope thereof.

Having thus described my invention, what I desire to claim as new is:

1. In a conveying apparatus, the combination of a conveyor belt, mechanism for driving said belt, means for guiding said belt to provide adjacent work supporting runs thereof, lying at an angle to each other, and connected by a downwardly extending loop, said means including a guiding member holding said loop taut and disposed angularly both with reference to the direction of travel of said runs and also with reference to the planes of said runs, the discharge end of the first run and the receiving end of the second run being located in approximately the same plane and separated from each other by a narrow crevice across which the articles conveyed will be carried by said runs.

2. In a conveying apparatus, the combination of a conveyor belt, mechanism for driving said belt, means for guiding said belt to provide three adjacent work supporting runs, the first serving to convey articles to the second, and the second to the third, the second of said runs lying at an angle to both the first and third runs, the adjacent ends of the three runs being so located with reference to each other as to convey the articles from one to the other without any abrupt change in the supporting plane of the articles, and said means so supporting the adjacent ends of said runs that they are separated, respectively, by narrow crevices each lying at an abrupt angle to a next adjacent run.

3. In a conveying apparatus, the combination of a conveyor belt, mechanism for driving said belt, and means for supporting and guiding said belt to provide two adjacent work supporting runs thereof, arranged in series, and lying at an abrupt angle to each other, with the receiving end of the second run located closely adjacent to and in approximately the same plane as the discharge end of the first run and separated from it by a narrow crevice but connected with it by a downwardly extending loop, said means including a guiding member holding said loop taut and disposed angularly both with reference to the direction of travel of said runs and also with reference to the planes of said runs.

4. In a conveying apparatus, the combination of a conveyor belt, mechanism for driving said belt, and means for supporting and guiding said belt to provide two adjacent work supporting runs thereof, arranged in series, and lying at an angle to each other, with the receiving end of the second run located closely adjacent to and in approximately the same plane as the discharge end of the first run and separated from it by a narrow crevice but connected with it by a downwardly extending loop, said crevice lying at an angle to one of said runs, and said means including a guiding member holding said loop taut and disposed angularly with reference both to the direction of travel of said runs and also with reference to the planes of the runs.

5. In a conveying apparatus, the combination of a conveyor belt, mechanism for driving said belt, and means for supporting and guiding said belt to provide two adjacent work supporting runs thereof, arranged in series, and lying at an angle to each other, with the receiving end of the second run located closely adjacent to and in approximately the same plane as the discharge end of the first run and separated from it by a narrow crevice but connected with it by a downwardly extending loop, whereby the first run is operative to convey and deliver articles to the second run and said articles are prevented from tumbling in moving across said crevice from one run to the other, said means for supporting and guiding the belt including a stationary member having an abrupt edge for guiding the belt at one side of said crevice and defining the angle which said side of the crevice will make with reference to the adjacent run of the belt.

6. In a conveying apparatus, the combination of a conveyor belt, mechanism for driving said belt, and means for supporting and guiding said belt to provide two adjacent work supporting runs thereof, arranged in series, and lying at an angle to each other, with the receiving end of the second run located closely adjacent to and in approximately the same plane as the discharge end of the first run and separated from it by a narrow crevice but connected with it by a downwardly extending loop, whereby the first run is operative to convey and deliver articles to the second run and said articles are prevented from tumbling in moving across said crevice from one run to the other, said means for supporting and guiding the belt including two relatively stationary devices having abrupt edges over which said belt runs at opposite sides of said crevice, said devices defining the angle of the edges of said crevice with reference to the adjacent runs of the belt.

7. In a conveyor system, a substantially flat conveyor arranged to travel in a plane, a diagonal guide member arranged and adapted to guide the conveyor out of its plane of movement, a second diagonal guide member adjacent to and parallel with the first said member arranged and adapted to guide the conveyor back into its plane of travel, and means below said two guide members for guiding the portion of the conveyor extending between the two guide members.

8. In a conveying apparatus, the combination of a conveyor belt, mechanism for driving said belt, and means for supporting and guiding said belt to provide two adjacent work supporting runs thereof, arranged in series, and one lying at an angle deviating laterally from the other, the receiving end of the second run being located closely adjacent to and in approximately the same plane as the discharge end of the first run but separated from it by a narrow crevice of substantially uniform width across which the articles conveyed will be carried by said runs.

9. In a conveying apparatus, the combination of a conveyor belt, mechanism for driving said belt, and means for supporting and guiding said belt to provide two adjacent work supporting runs thereof, arranged in series, and one lying at a laterally divergent angle to the other, said runs being in the same horizontal plane and the receiving end of the second run being located closely adjacent to the discharge end of the first run but separated from it by a narrow crevice lying at an angle to one of said runs and across which the articles conveyed will be carried by said runs.

10. In a conveyor system, the combination with a conveyor belt including two stretches extending at a laterally divergent angle to each other and both located in substantially the same horizontal plane at their adjacent ends, two horital guides angularly disposed with reference to said stretches and located at the adjacent ends of the stretches and around which the belt is guided respectively out of and into the plane of said stretches, said guides being parallel with each other and located close together, and additional guide means associated with said angularly disposed guides for maintaining the belt in a substantially taut condition.

FREDERICK WADE GREER.